United States Patent
Naruse et al.

(10) Patent No.: US 9,344,590 B2
(45) Date of Patent: May 17, 2016

(54) NETWORK SYSTEM, MOBILE TERMINAL, INFORMATION PROCESSING APPARATUS, AND CONTROL METHOD

(71) Applicant: CANON KABUSHIKI KAISHA, Tokyo (JP)

(72) Inventors: Taketomo Naruse, Yokohama (JP); Akihiro Chiba, Yokosuka (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 21 days.

(21) Appl. No.: 14/337,795

(22) Filed: Jul. 22, 2014

(65) Prior Publication Data

US 2015/0038076 A1 Feb. 5, 2015

(30) Foreign Application Priority Data

Jul. 31, 2013 (JP) ................. 2013-159718

(51) Int. Cl.
| | |
|---|---|
| *H04B 5/00* | (2006.01) |
| *H04M 1/00* | (2006.01) |
| *H04N 1/00* | (2006.01) |
| *H04W 4/00* | (2009.01) |
| *H04B 5/02* | (2006.01) |

(52) U.S. Cl.
CPC ......... *H04N 1/00307* (2013.01); *H04B 5/0031* (2013.01); *H04B 5/0037* (2013.01); *H04B 5/02* (2013.01); *H04W 4/008* (2013.01); *H04N 2201/0055* (2013.01); *H04N 2201/0094* (2013.01); *H04N 2201/0096* (2013.01)

(58) Field of Classification Search
CPC ............. H04W 4/008; H04W 52/0261; H04B 5/0031; H04B 5/0037
USPC .................. 455/41.1, 41.2, 552.1, 553.1, 573
See application file for complete search history.

(56) References Cited

U.S. PATENT DOCUMENTS

| | | | | |
|---|---|---|---|---|
| 8,198,858 | B2 * | 6/2012 | Kim ........................ | H02J 7/025 455/573 |
| 8,271,056 | B2 * | 9/2012 | Keohane ............... | G06F 1/3203 455/573 |
| 8,635,269 | B2 * | 1/2014 | LaFrance ............ | B60L 11/1848 701/22 |
| 8,792,827 | B2 * | 7/2014 | Sakata .............. | H04W 52/0229 455/41.2 |

(Continued)

FOREIGN PATENT DOCUMENTS

| | | |
|---|---|---|
| JP | 2006-48270 A | 2/2006 |
| JP | 2007-140990 A | 6/2007 |

(Continued)

*Primary Examiner* — Quochien B Vuong
(74) *Attorney, Agent, or Firm* — Fitzpatrick, Cella, Harper & Scinto

(57) ABSTRACT

An embodiment of this invention is directed to a technique capable of appropriately performing a charging process for recharging in an apparatus which is wirelessly rechargeable during communication. According to the embodiment, a mobile terminal which operates by a rechargeable battery, includes a recharge unit configured to recharge the rechargeable battery by wireless power supply, and can transmit a job to an information processing apparatus by short distance wireless communication is operated as follows. An inquiry message for inquiring of a user whether to recharge the rechargeable battery by wireless power supply, which is subject to a paid system, is displayed at the time of transmission of the job. At this time, transmission of the job by short distance wireless communication and display of the inquiry message are controlled to be performed at different timings.

29 Claims, 11 Drawing Sheets

(56) References Cited

U.S. PATENT DOCUMENTS

| | | | |
|---|---|---|---|
| 2012/0179884 A1* | 7/2012 | Araki | A63F 13/12 711/159 |
| 2013/0229672 A1 | 9/2013 | Naruse | |
| 2014/0046707 A1* | 2/2014 | Hama | G06Q 10/20 705/5 |
| 2015/0036176 A1* | 2/2015 | Naruse | H04N 1/00925 358/1.15 |
| 2015/0036177 A1* | 2/2015 | Naruse | H04N 1/00307 358/1.15 |
| 2015/0065037 A1* | 3/2015 | Burrell | G06K 7/10158 455/41.1 |

FOREIGN PATENT DOCUMENTS

| | | |
|---|---|---|
| JP | 2007-166538 A | 6/2007 |
| JP | 2008-113519 A | 5/2008 |

\* cited by examiner

NETWORK SYSTEM, MOBILE TERMINAL, INFORMATION PROCESSING APPARATUS, AND CONTROL METHOD

BACKGROUND OF THE INVENTION

1. Field of the Invention

The present invention relates to a network system, a mobile terminal, an information processing apparatus, and a control method and, more particularly, to a network system capable of performing communication by short distance wireless communication, a mobile terminal, an information processing apparatus included in the system, and a control method.

2. Description of the Related Art

Conventionally, there is known a technique of paying a fee for printing executed by a printing device by general-purpose electronic money stored in an IC card or the like (see Japanese Patent Laid-Open No. 2007-140990). In a billing and settlement system disclosed by Japanese Patent Laid-Open No. 2007-140990, a print job transmitted by a terminal is printed after a printing device charges for the print job by using general-purpose electronic money. In this system, an information terminal such as a PC transmits a print job, and another IC card is used to charge for the print job. In recent years, there is also known a technique of incorporating the mechanism of general-purpose electronic money of an IC card in a mobile terminal (see Japanese Patent Laid-Open No. 2006-048270).

As another technique, there is known a high-speed data transfer technique using a mobile terminal. This high-speed data transfer technique is known to perform short distance wireless communication in addition to conventional communication via a communication network. A partner communication apparatus of short distance wireless communication is, for example, an MFP (Multi Function Printer). It is known to transmit and receive image data and the like between the MFP and the mobile terminal. By using the above-described mechanism of general-purpose electronic money of an IC card and a mechanism of transmitting and receiving image data and the like using a mobile terminal, it is possible to complete processing from transmission of a print job to payment using one mobile terminal.

Furthermore, to implement efficient communication in terms of the communication speed and operability, it is known to perform short distance wireless communication using two types of communication methods. There has been proposed an arrangement in which information of a targeted unit necessary for the second short distance wireless communication method is transmitted and received by the first short distance wireless communication method with which the communication speed is relatively low and it is possible to reliably specify a communication partner, and high-speed communication is performed by the second short distance wireless communication method using the information (see Japanese Patent Laid-Open No. 2007-166538).

The first short distance wireless communication method is, for example, NFC (Near Field Communication), and the second short distance wireless communication method is, for example, Bluetooth® or wireless LAN. Japanese Patent Laid-Open No. 2007-140990 proposes a printer which first transmits the communication method and encryption method to be used for next communication by NFC and, in a case where communication is to be switched over, switches over the communication to execute printing using the second communication method. Processing of performing pairing by the first short distance wireless communication method and then switching over the communication to the second short distance wireless communication method will be referred to as a handover hereinafter.

As still another technique, there is known a wireless power supply system including a power supply apparatus for wirelessly outputting power without connection via connector, and an electronic device for recharging a battery by the power wirelessly supplied by the power supply apparatus (see Japanese Patent Laid-Open No. 2008-113519).

By integrating and using these techniques, an apparatus for paying a value of recharging of a mobile terminal by general-purpose electronic money is considered. Especially, the techniques are applicable to a system in which a recharge function is readily provided to the user whose mobile terminal has a small remaining battery capacity when the user is away from the house, for example, when the user is in a public place, and a value of recharging is paid by electronic money.

When using the above-described conventional wireless power supply system, however, the following problem arises.

That is, although the advantage of wireless power supply is that it is possible to recharge an apparatus by only touching without connecting a connector, the apparatus may be recharged against the user's intention in a case where the user is charged for recharging. For example, if the user accidentally, momentarily touches a recharge stand with a mobile terminal even though the user does not want to recharge the mobile terminal, the mobile terminal may enter a recharge mode.

SUMMARY OF THE INVENTION

Accordingly, the present invention is conceived as a response to the above-described disadvantages of the conventional art.

For example, a network system, a mobile terminal, an information processing apparatus, and a control method according to this invention are capable of appropriately performing a charging process for recharging in an apparatus which is wirelessly rechargeable during communication.

According to one aspect of the present invention, there is provided a network system comprising a mobile terminal which is capable of operating by a rechargeable battery and transmits a job by short distance wireless communication, and an information processing apparatus which receives the job by short distance wireless communication, and executes the job. In the network system, the information processing apparatus comprises: a first communication unit configured to perform short distance wireless communication; a power supply unit configured to supply power by wireless power supply; and a processing unit configured to execute processing of the job received from the mobile terminal by the first communication unit. In the network system, the mobile terminal comprises: a second communication unit configured to perform short distance wireless communication with the first communication unit of the information processing apparatus; and a recharge unit configured to recharge the rechargeable battery by wireless power supply by the power supply unit. In the network system, it is controlled to perform an inquiry operation of inquiring of a user whether to recharge the rechargeable battery by wireless power supply at a timing different from a timing of transmission of the job based on start or completion of the transmission by the first communication unit.

According to another aspect of the present invention, there is provided the above mentioned mobile terminal. The mobile terminal further comprises: a query unit configured to inquire of a user whether to recharge the rechargeable battery by wireless power supply; and a control unit configured to control to perform the inquiry operation by the query unit at a timing different from a timing of the communication based on start or completion of transmission of the job by the communication unit.

According to still another aspect of the present invention, there is provided the above mentioned information processing apparatus. The apparatus further comprises: a charge unit configured to charge for the power supply by the power supply unit; a determination unit configured to determine whether a remaining capacity of the rechargeable battery of the mobile terminal is not larger than a predetermined value by performing the short distance wireless communication with the mobile terminal by the first communication unit; a query unit configured to, in a case where the determination unit determines that the remaining capacity is not larger than the predetermined value, inquire of a user whether to recharge the rechargeable battery by wireless power supply by the power supply unit, which is subject to a paid system; and a control unit configured to control, in accordance with a response to the query unit, the charge unit to charge and the power supply unit to supply power.

According to still another aspect of the present invention, there is provided a control method for a mobile terminal which operates by a rechargeable battery and includes a recharge unit configured to recharge the rechargeable battery by wireless power supply. The method comprises: transmitting a job to an information processing apparatus by short distance wireless communication; and controlling to inquire of a user whether to recharge the rechargeable battery by wireless power supply at a timing different from a timing of transmission of the job based on start or completion of the transmission.

According to still another aspect of the present invention, there is provided a non-transitory computer readable storage which stores a computer program to be executed in a mobile terminal which is capable of operating by a rechargeable battery and transmits a job to an information processing apparatus by short distance wireless communication. The program comprises: performing short distance wireless communication; inquiring of a user whether to recharge the rechargeable battery by wireless power supply; controlling to perform the inquiry operation at a timing different from a timing of the communication based on start or completion of transmission of the job by the short distance wireless communication; and recharging the rechargeable battery by wireless power supply.

The invention is particularly advantageous since it is possible to appropriately perform a charging process for recharging in an apparatus which is wirelessly rechargeable during communication.

Further features of the present invention will become apparent from the following description of exemplary embodiments (with reference to the attached drawings).

DESCRIPTION OF THE EMBODIMENTS

Exemplary embodiments of the present invention will now be described in detail in accordance with the accompanying drawings. Note that the relative arrangement of components and the like set forth in the embodiments do not limit the scope of the present invention unless otherwise specified.

In this specification, the terms "print" and "printing" not only include the formation of significant information such as characters and graphics, but also broadly includes the formation of images, figures, patterns, and the like on a print medium, or the processing of the medium, regardless of whether they are significant or insignificant and whether they are so visualized as to be visually perceivable by humans.

Also, the term "print medium" not only includes a paper sheet used in common printing apparatuses, but also broadly includes materials, such as cloth, a plastic film, a metal plate, glass, ceramics, wood, and leather, capable of accepting ink.

In this embodiment, a case will be described in which billed recharging is also performed in a case where the user of a mobile terminal generates a print job, and transmits the job using NFC. In the case of free recharging, when detecting a mobile terminal, a recharge apparatus automatically recharges the mobile terminal. In the case of billed recharging, it is necessary to confirm whether or not the user wants to recharge the mobile terminal. On the other hand, it is troublesome for the user to be asked to confirm whether or not to recharge the mobile terminal every time the mobile terminal touches a recharge stand. To improve the user convenience, therefore, it is desirable to urge the user to recharge the mobile terminal at an appropriate timing while simplifying a recharging operation.

In this embodiment, printing sequence control and recharging sequence control when a mobile terminal is recharged simultaneously with transmission of a job to a multi-function printer (to be referred to as an MFP hereinafter) using the mobile terminal will be described in consideration of the above situation. Especially a case will be explained in which when transmitting a job, authentication is performed by low-speed communication using a short distance wireless communication method, and then the communication method is switched over to high-speed communication to transmit print data. More specifically, a handover technique is used in which authentication is performed by communication such as NFC (Near Field Communication) using a short distance and non-contact induced method and wireless communication according to another communication method takes over the communication. Furthermore, general-purpose electronic money is used to charge for a job and recharging, and billing control is executed by communication using NFC in the same manner.

Figure 1:
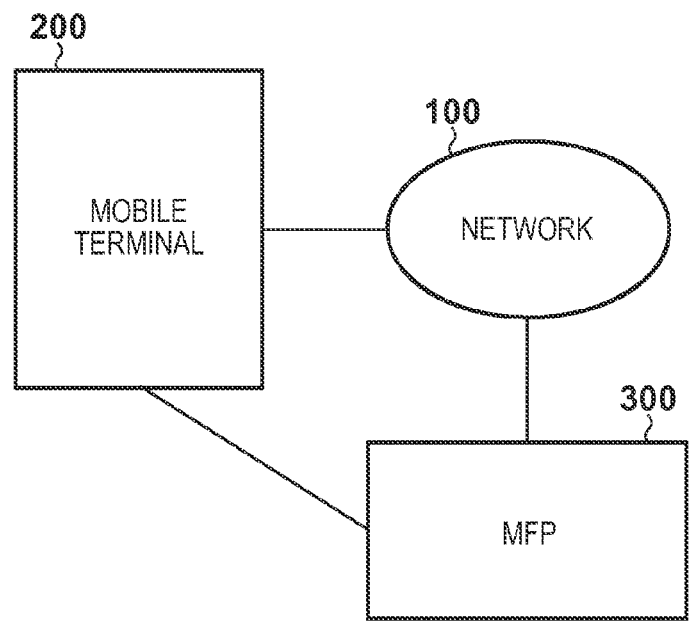
FIG. 1 is a block diagram showing the overall configuration of a network system capable of performing communication by short distance wireless communication according to an exemplary embodiment of the present invention.

FIG. 1 is a block diagram showing the configuration of a network system using a short distance wireless communication method according to an exemplary embodiment of the present invention. The system has a basic configuration in which a mobile communication terminal (to be referred to as a mobile terminal hereinafter) 200 and a multi-function printer (to be referred to as an MFP, printing apparatus, or information processing apparatus hereinafter) 300 are connected to each other via a network 100.

The mobile terminal 200 implements at least two types of wireless communication protocols with different authentication methods and different communication speeds. The mobile terminal need only be an apparatus capable of handling files of print targets, for example, a personal information terminal such as a PDA (Personal Digital Assistant), a mobile phone, a smart phone, or a digital camera. The MFP 300 is a multi-function printer including a display unit and operation panel through which various settings can be made, and having a printer function of using an inkjet printer or the like as a printer engine, a scanner function of reading a document placed on a document table, a FAX function, and a telephone function.

The network 100 and MFP 300 are connected by wired LAN or wireless LAN (to be referred to as WLAN hereinafter). The network 100 and mobile terminal 200 are connected by WLAN. Since both the mobile terminal 200 and the MFP 300 have a WLAN function, they can perform peer to peer (to be referred to as P2P hereinafter) communication by authenticating each other. Furthermore, the mobile terminal 200 and MFP 300 can communicate data with each other using NFC.

Figure 2:
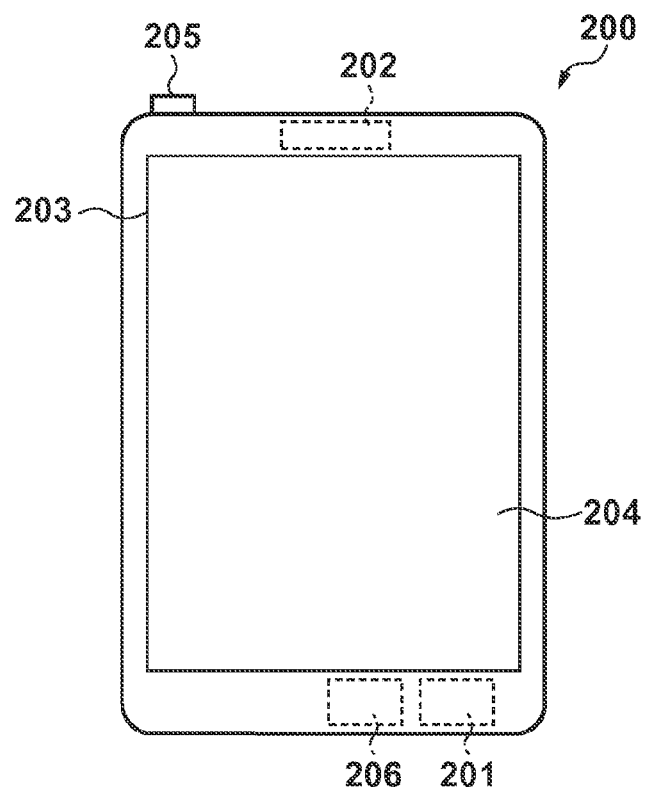
FIG. 2 is a front view showing a mobile terminal.

FIG. 2 is a front view showing the mobile terminal 200 such as a smart phone. The smart phone indicates a multi-function mobile phone including a camera, network browser, and mail function in addition to a mobile phone function.

Referring to FIG. 2, an NFC unit 201 performs communication using NFC. Actually, communication can be performed when the user moves the NFC unit 201 close to within about 10 cm of the NFC unit of a communication partner. A WLAN unit 202 is used to perform communication using WLAN, and is arranged within the apparatus. Note that the communicable range of WLAN is wider than that (about 10 cm) of NFC. A display unit 203 is formed from an LCD display on which an operation unit 204 with an electrostatic touch-panel operation mechanism is arranged. The operation unit 204 detects user operation information. As a typical operation method, the display unit 203 displays button-shaped menus, and when the user touches the operation unit 204, an event associated with the button portion is issued to execute processing. A power key 205 is used to turn on/off the power. A wireless recharge unit 206 is a recharge unit adopting a non-contact recharging method. When the wireless recharge unit 206 is moved close to within a predetermined distance of a wireless recharge stand 308 of the MFP 300 (to be described later), it can recharge the mobile terminal 200.

Figure 3A:
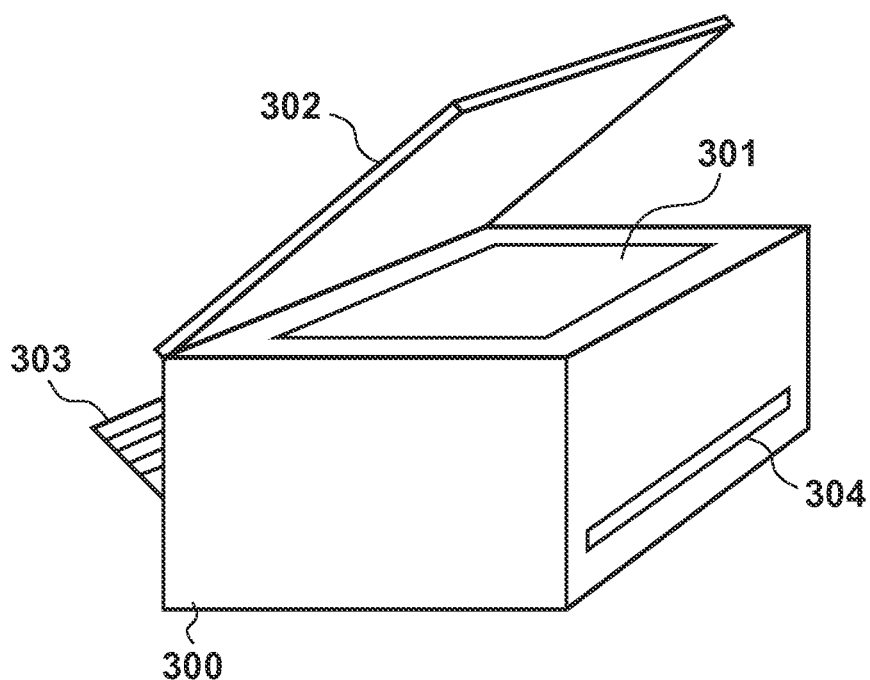
FIGS. 3A and 3B are views each schematically showing the outer appearance of an MFP.
Figure 3B:
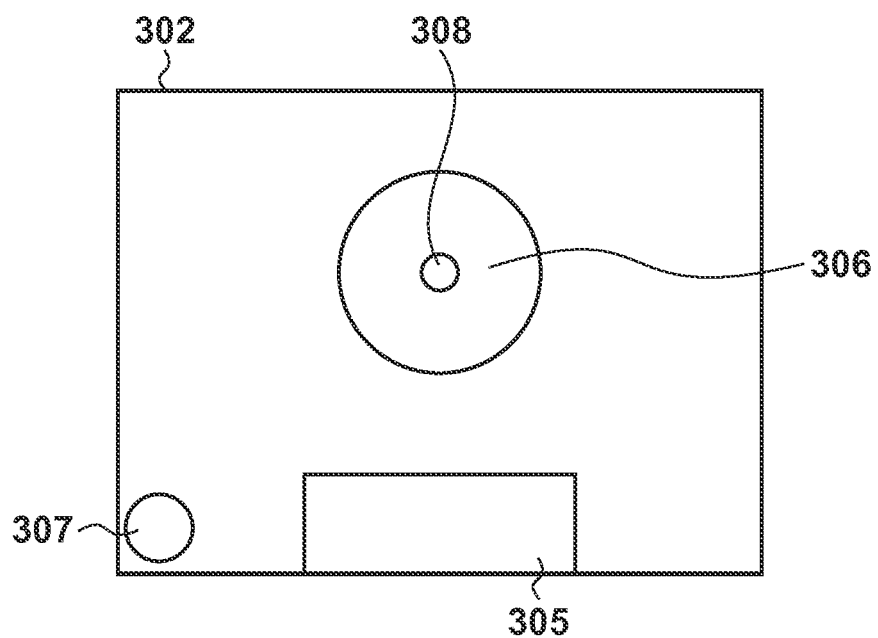

FIGS. 3A and 3B are views each schematically showing the outer appearance of the MFP 300. FIG. 3A is a perspective view showing the outer appearance and FIG. 3B is a plan view showing the MFP.

A document table 301 is a transparent glass table and is used to place a document to be read by the scanner. A document cover 302 is used to prevent reading light from externally leaking at the time of reading by the scanner. A printing paper insert port 303 is used to set paper sheets of various sizes. The paper sheets set in the printing paper insert port 303 are conveyed to a printing unit (printer engine) one by one, undergo any desired printing, and are discharged from a printing paper discharge port 304.

As shown in FIG. 3B, an operation display unit 305 and an NFC unit 306 are arranged on the document cover 302. The operation display unit 305 includes keys for various operations and an LCD display, with which it is possible to perform an operation and make settings for the MFP 300. The NFC unit 306 is a unit used to perform short distance wireless communication, and is a place, close to which the user actually moves the mobile terminal 200. An effective communicable distance is about 10 cm from the NFC unit 306. A WLAN antenna 307 is used for WLAN communication, and is embedded in the document cover 302. The wireless recharge stand 308 is used to recharge the mobile terminal by an induced method. When the mobile terminal 200 is moved close to within the predetermined distance of the wireless recharge stand 308, it is possible to recharge the mobile terminal 200 by inducing a current for a coil on the power receiving side of the wireless recharge unit 206. An effective rechargeable distance is about 2 cm from the wireless recharge stand (placing stand) 308. When the mobile terminal 200 is arranged at a position where the NFC unit 306 and the wireless recharge stand 308 are simultaneously usable, it can perform recharging and communication at the same time.

Figure 4:
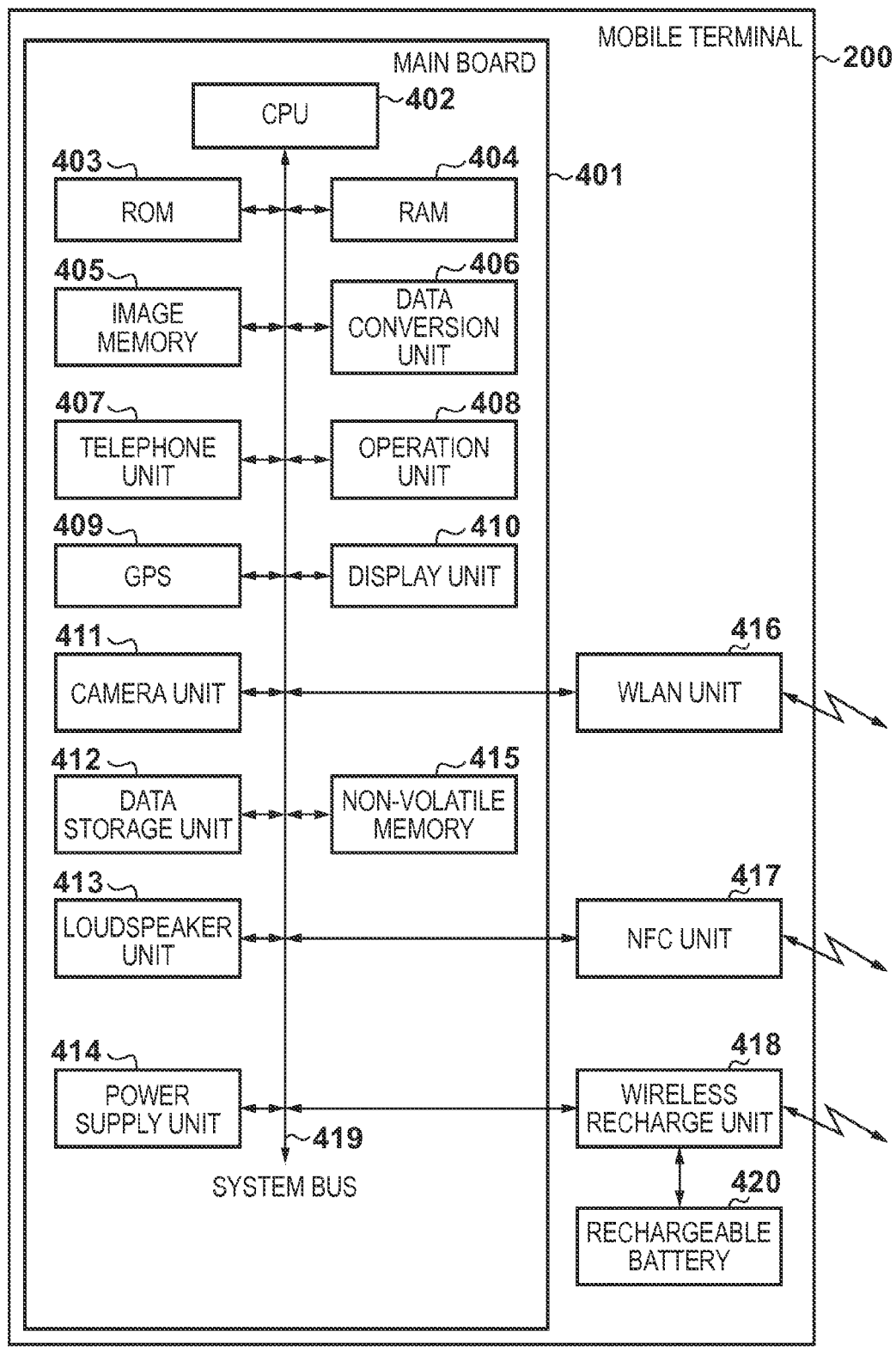
FIG. 4 is a block diagram showing the arrangement of the mobile terminal.

FIG. 4 is a block diagram showing the arrangement of the mobile terminal 200.

The mobile terminal 200 includes a main board 401 for controlling the apparatus as a whole, a WLAN unit 416 for performing WLAN communication, an NFC unit 417 for performing NFC communication, a wireless recharge unit 418 for performing wireless recharging, and a rechargeable battery 420.

A CPU 402 of the main board 401 serves as a system control unit for controlling the mobile terminal 200 as a whole. A ROM 403 stores control programs, an embedded operating system (OS) program, and the like to be executed by the CPU 402. In this embodiment, each control program stored in the ROM 403 performs software control such as scheduling or task switching under the management of the embedded OS stored in the ROM 403. A RAM 404 is formed from an SRAM or the like. The RAM 404 stores program control variables, setting values registered by the user, management data for the mobile terminal 200, and the like, and also is used as various work buffer areas.

An image memory 405 is formed from a DRAM or the like, and temporarily stores image data received via the communication unit or image data read out from a data storage unit 412 for processing by the CPU 402. A non-volatile memory 415 is formed from a flash memory or the like, and stores data to be saved even after power-off. Examples of the data are telephone directory data and information of devices connected in the past. Note that the memory configuration is not limited to that shown in FIG. 4. For example, the image memory 405 and RAM 404 may share a memory, or data may be backed up in the data storage unit 412. Although the DRAM is used in this embodiment, the present invention is not limited to this, and a hard disk, a non-volatile memory, or the like may be used.

A data conversion unit 406 performs analysis of page description language (PDL) and the like, and data conversion such as color conversion and image conversion. A telephone unit 407 controls a telephone line, and processes voice data input/output through a loudspeaker unit 413, thereby implementing communication by telephone. An operation unit 408 controls a signal generated by the operation unit 204 described with reference to FIG. 2. A GPS (Global Positioning System) 409 acquires information related to the current latitude and longitude. A display unit 410 electronically controls display contents of the display unit 203 described with reference to FIG. 2, and can display various input operations, the operation state and status of the MFP 300, and the like.

A camera unit 411 has a function of electronically recording and encoding an image input via a lens. An image captured by the camera unit 411 is saved in the data storage unit 412. The loudspeaker unit 413 implements a function of inputting or outputting voice for the telephone function, an alarm notification function, and the like. A power supply unit 414 includes a portable battery, and controls the power supply. Power supply states include a battery empty state corresponding to a zero battery level, a power-off state before the user presses the power key 205, an active state (power-on state) in which the apparatus is normally activated, and a power-saving state in which the apparatus is activated but in a power saving mode.

The mobile terminal 200 integrates two wireless communication units, and performs data communication with another device such as an MFP by performing wireless communication by WLAN and NFC. At this time, the communication unit converts data into a packet, and transmits the packet to another device. To the contrary, the communication unit receives a packet from another external device, converts the packet into data, and transmits the converted data to the CPU 402. In this embodiment, NFC is used to send connection information for a handover, transmit a job, and exchange billing information. WLAN takes over wireless connection from NFC by a handover, thereby transmitting and receiving job data at high speed. The WLAN unit 416 and NFC unit 417 are connected by bus cables or the like. The WLAN unit 416 and NFC unit 417 implement communication conforming to the respective specifications. The NFC unit will be described in detail later with reference to FIG. 6. The wireless recharge unit 418 implements recharging conforming to, for example, the Qi® specification.

The above-described components 403 to 418 are connected to each other via a system bus 419 managed by the CPU 402.

Figure 5:
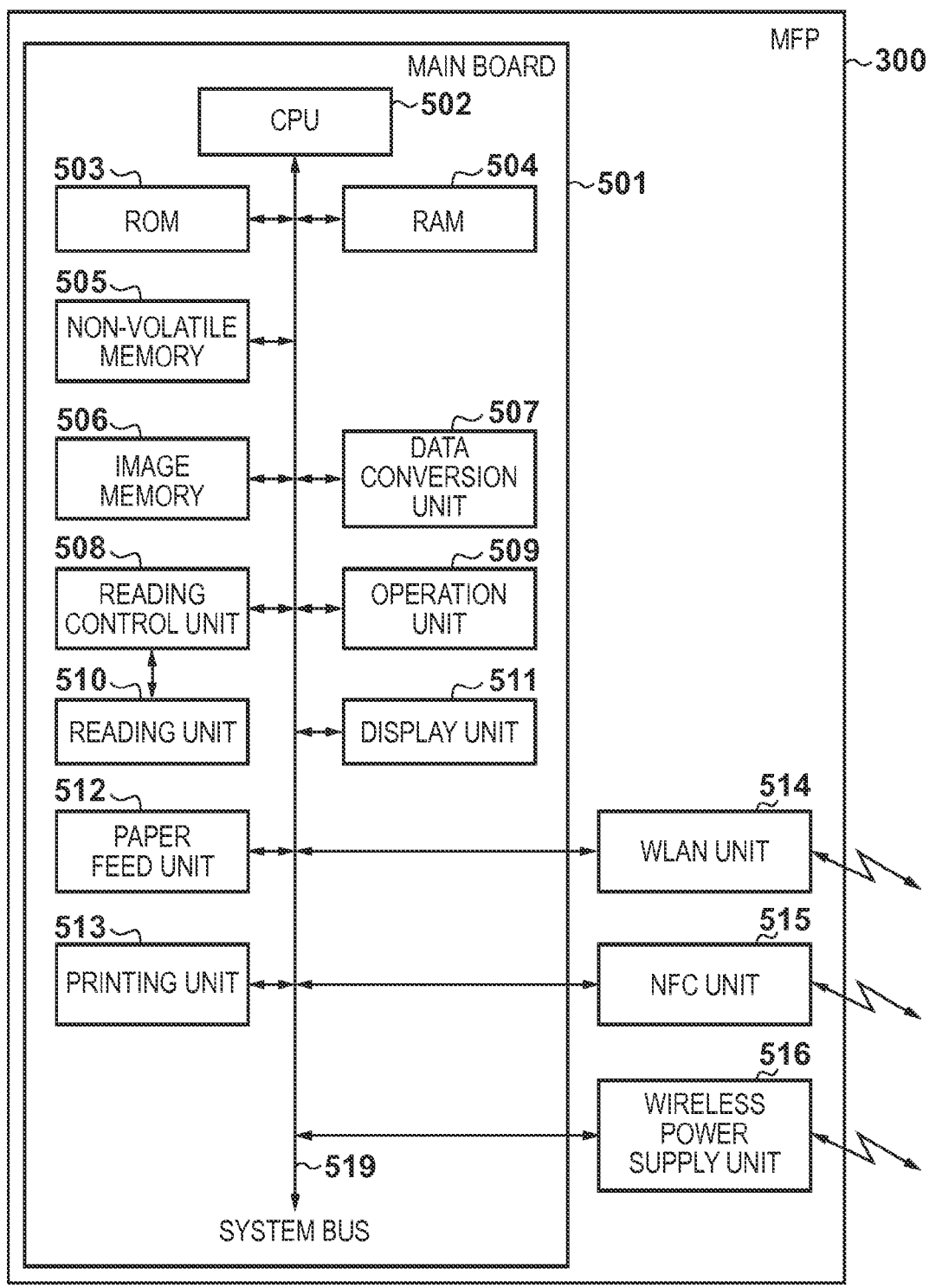
FIG. 5 is a block diagram showing the schematic arrangement of the MFP.

FIG. 5 is a block diagram showing the schematic arrangement of the MFP 300.

The MFP 300 includes a main board 501 for controlling the apparatus as a whole, a WLAN unit 514 for performing WLAN communication, an NFC unit 515 for performing NFC communication, and a wireless power supply unit 516.

A CPU 502 of the main board 501 serves as a system control unit for controlling the MFP 300 as a whole. A ROM 503 stores control programs, an embedded operating system (OS) program, and the like to be executed by the CPU 502. In this embodiment, each control program stored in the ROM 503 performs software control such as scheduling or task switching under the management of the embedded OS stored in the ROM 503. One of the control programs executes billing control, and exchanges control commands for charging with the mobile terminal 200 using the NFC unit 515. Another control program executes recharging control, and it is thus possible to switch between the recharging enabled state and recharging disabled state of the wireless power supply unit 516 in accordance with the charging status.

A RAM 504 is formed from an SRAM or the like. The RAM 504 stores program control variables, setting values registered by the user, management data for the MFP 300, and the like, and also is used as various work buffer areas. A non-volatile memory 505 is formed from a flash memory or the like, and stores data to be saved even after power-off.

More specifically, the non-volatile memory 505 stores network connection information, user data, and the like. An image memory 506 is formed from a DRAM or the like, and stores image data received via each communication unit, image data processed by a data conversion unit 507, and the like. Like the memory configuration of the mobile terminal 200, the memory configuration is not limited to this. The data conversion unit 507, for example, performs analysis of page description language (PDL) data and the like, and conversion of image data into print data.

An image signal, generated in a case where a reading unit 510 controlled by a reading control unit 508 causes a CIS image sensor to optically read a document, undergoes various image processes such as binarization processing and halftoning via an image processing control unit (not shown), thereby outputting high-resolution image data.

An operation unit 509 and a display unit 511 represent the operation display unit 305 described with reference to FIG. 3, and are formed from keys operated by the user, and an LCD for displaying data.

A paper feed unit 512 holds printing media such as printing paper sheets. The paper feed unit 512 can perform a paper feed operation under the control of a printing unit 513. Especially, the paper feed unit may include a plurality of paper feed units to hold a plurality of kinds of printing paper sheets in one apparatus. In this case, the printing unit 513 controls to select a paper feed unit to feed printing paper sheets.

The printing unit 513 converts image data to be printed into high-resolution image data by executing, via the image processing control unit (not shown), various image processes such as smoothing processing, printing density correction processing, and color correction, and outputs the obtained image data. The printing unit 513 periodically reads out information of the printer engine to update status information stored in the RAM 504. More specifically, the printing unit 513 updates the residual amount of an ink tank, the state of a printhead, and like.

Similarly to the mobile terminal 200, the MFP 300 integrates two wireless communication units. Each function is the same as that of the mobile terminal 200, and a description thereof will be omitted.

The above-described components 502 to 516 are connected to each other via a system bus 519 managed by the CPU 502.

Figure 6:
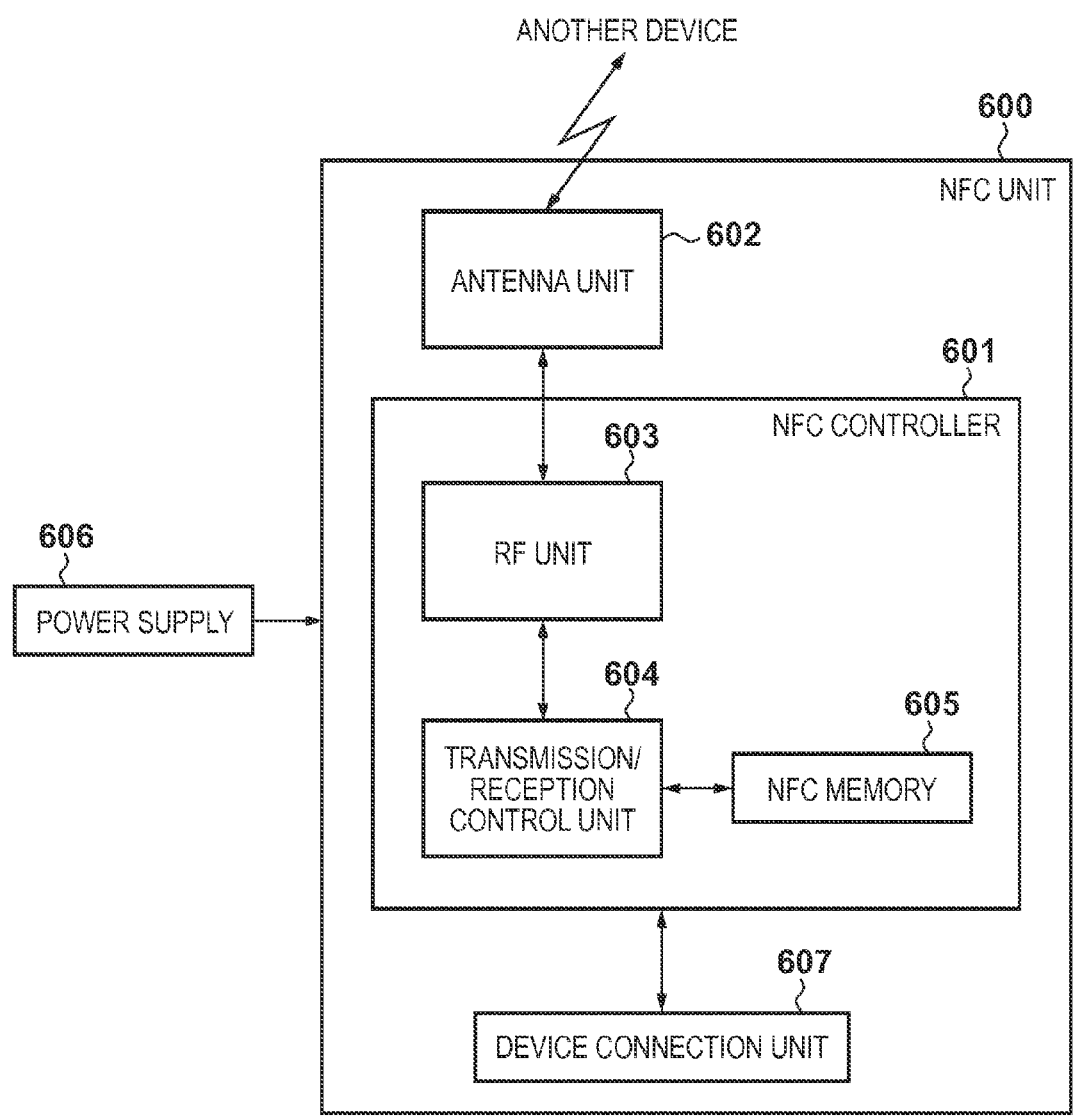
FIG. 6 is a block diagram showing the detailed arrangement of an NFC unit.

FIG. 6 is a block diagram showing the detailed arrangement of an NFC unit used as the NFC unit 417 or NFC unit 515.

NFC communication will now be described. For near field communication using an NFC unit, an apparatus which generates an RF (Radio Frequency) field to start communication will be referred to as an initiator hereinafter. An apparatus which communicates with the initiator in response to an instruction issued by the initiator will be referred to as a target hereinafter.

A passive mode and active mode will be described next. The communication modes of the NFC unit include a passive mode and active mode. In the passive mode, a target responds to an instruction of an initiator by performing load modulation. It is, therefore, unnecessary to supply power to the target. On the other hand, in the active mode, a target responds to an instruction of an initiator by an RF field generated by the target itself. It is, therefore, necessary to supply power to the target. The active mode has a feature of having a communication speed higher than that in the passive mode.

Referring back to FIG. 6, an NFC unit 600 includes an NFC controller 601, an antenna unit 602, an RF unit 603, a transmission/reception control unit 604, an NFC memory 605, and a device connection unit 607. A power supply 606 is provided outside the NFC unit 600. The antenna unit 602 receives/transmits a radio wave or a carrier wave from/to another NFC device. The RF unit 603 has a function of modulating/demodulating an analog signal into/from a digital signal. The RF unit 603 includes a synthesizer to identify the frequency of a band or a channel and control the band or channel using frequency assignment data. The transmission/reception control unit 604 performs control concerning transmission/reception, including assembling and disassembling of a transmission/reception frame, preamble addition and detection, and frame identification. The transmission/reception control unit 604 also controls the NFC memory 605 to input/output various data and programs.

The NFC memory 605 is formed from a non-volatile memory. In a case where the NFC unit operates in the active mode, it receives power via the power supply 606, and communicates with another device via the device connection unit 607 or communicates with another NFC device existing within a communicable range by a carrier wave transmitted/received via the antenna unit 602. To the contrary, in a case where the NFC unit operates as a target in the passive mode, it receives a carrier wave from another NFC device via the antenna unit 602, and receives power from the other NFC device by electromagnetic induction. The NFC unit then communicates with the other NFC device by modulating the carrier wave, thereby transmitting/receiving data. Therefore, the target in the passive mode can wirelessly communicate with the initiator even if no power is supplied from the battery, the AC power supply, or the like.

Note that data to be used for charging is saved in the NFC memory 605. A given amount is held in the mobile terminal 200 using a dedicated application. When using electronic money, the user pays a predetermined fee using the NFC unit 417. Since billing data is stored in the NFC memory 605, even if the mobile terminal 200 is in the battery empty state, and cannot thus be turned on, it is possible to perform a charging process.

Control when the mobile terminal 200 requests a print job and executes wireless recharging by performing short distance wireless communication with the MFP 300 in the network having the above-described arrangement will be explained.

FIGS. 7A to 7D are timing charts for explaining a timing of inquiring whether or not to perform recharging by short distance wireless communication. Note that in each of FIGS. 7A, 7B, 7C, and 7D, a communication preparation operation 701, 707, 713, or 719 indicates a procedure such as authentication when performing NFC communication and a detailed description thereof will be provided later with reference to FIG. 8.

Figure 7A:
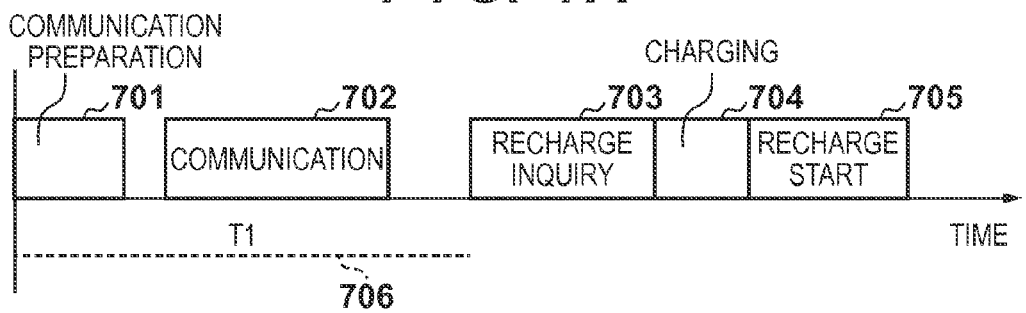
FIGS. 7A, 7B, 7C, and 7D are timing charts for explaining a timing of inquiring whether to perform recharging by short distance wireless communication.

Case in which Recharge Inquiry Operation is Performed when Timer Expires after Transmission of Job (FIG. 7A)

Referring to FIG. 7A, when the mobile terminal 200 is moved close to the NFC unit 306 of the MFP 300, the communication preparation operation 701 is performed. Upon completion of mutual authentication, communication becomes possible. At the start of the communication preparation operation 701, the mobile terminal 200 starts to measure a time T1 (706) by a timer. In a communication operation 702, job data is transmitted. In a recharge inquiry operation 703, the mobile terminal 200 inquires of the user whether or not to perform recharging even though the user must pay for recharging. As a result, if recharging is to be performed, an account is settled using electronic money in a charging operation 704, and then recharging starts in a recharge start operation 705.

Note that in the recharge inquiry operation 703, when the predetermined time T1 elapses after the start of the communication preparation operation, the mobile terminal 200 inquires of the user recharging. This can recommend the user, who has been placing the mobile terminal 200 on the MFP 300 for the predetermined time T1 or more, to perform recharging. It is, therefore, possible to prevent recharging and charging from being performed without user's permission when the user accidentally touches the NFC unit 306 with the mobile terminal 200 for a short time. Furthermore, when the user wants to only transmit a job, and touches the MFP with the mobile terminal for a short time, the recharge inquiry operation is not immediately performed since it is possible to prioritize communication of a job, thereby eliminating annoyance to the user. In the example shown in FIG. 7A, the mobile terminal 200 measures the predetermined time T1 and performs the recharge inquiry operation 703. These processes, however, may be performed by the MFP 300. In this case, these processes are executed by mutually confirming a timing and capability by wireless communication.

Figure 7B:
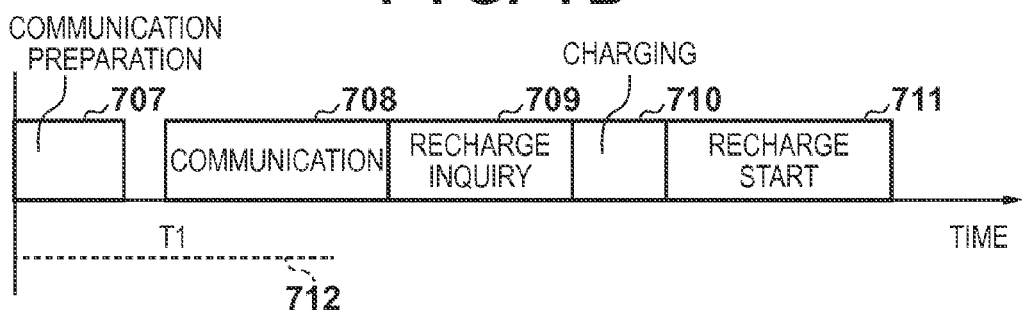

Case in which Timer Expires During Communication (FIG. 7B)

As shown in FIG. 7B, when a predetermined time T1 (712) elapses while executing a communication operation 708, a response from the user cannot be known unless the communication operation 708 in progress ends. In this case, execution of a recharge inquiry operation 709 is made to stand by until the communication operation 708 ends. This can control not to execute the recharge inquiry operation 709 when, for example, the communication operation 708 is a one-time job such as a state inquiry.

Figure 7C:
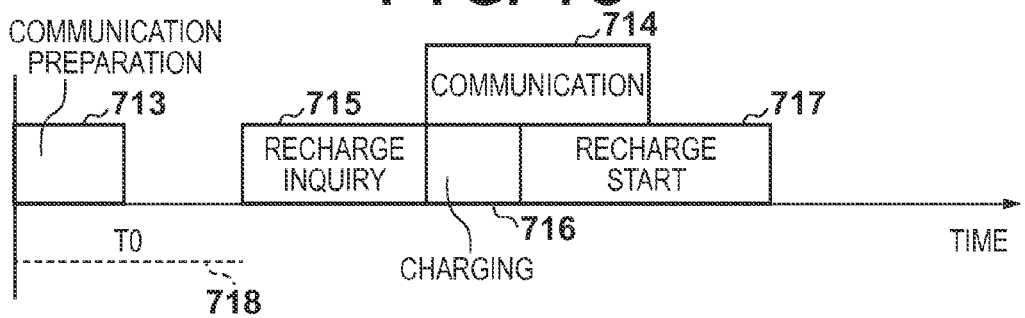

Case in which Timer Expires Before Start of Communication (FIG. 7C)

As shown in FIG. 7C, when a predetermined time T0 (718) set as a time-out time until the start of communication elapses before execution of a communication operation 714, a recharge inquiry operation 715 is executed first. Note that the predetermined time T0 is set shorter than the predetermined time T1. The display unit 203 is occupied during the recharge inquiry operation. However, if the communication operation 714 does not use the display unit 203, it may be started before the end of the recharge inquiry operation 715. This can start recharging first when the communication operation 714 is made to stand by to perform preprocessing such as image processing requiring time.

Figure 7D:
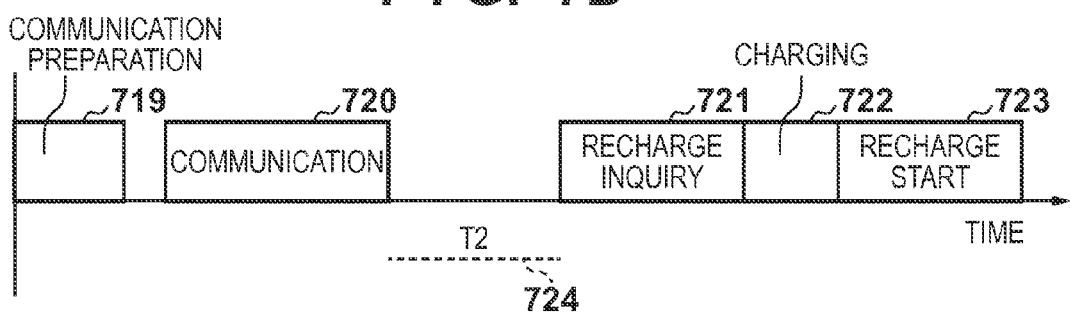

Case in which Time is Measured by Timer after End of Communication (FIG. 7D)

As shown in FIG. 7D, after the end of a communication operation 720, measurement of a time by a timer starts. When a predetermined time T2 (724) elapses, it is determined that the user wants to perform recharging simultaneously with communication since the mobile terminal 200 is kept placed on the NFC unit 306 for a long time even though communication has ended. In this case, therefore, a recharge inquiry operation 721 is performed for the user. As described above, by executing the recharge inquiry operation after the given time elapses without performing recharging immediately after the end of transmission of a job, it is possible to perform recharging by selecting a user who intends to perform recharging.

Contents of NFC communication between the mobile terminal 200 and the MFP 300 will be described in detail.

Figure 8:
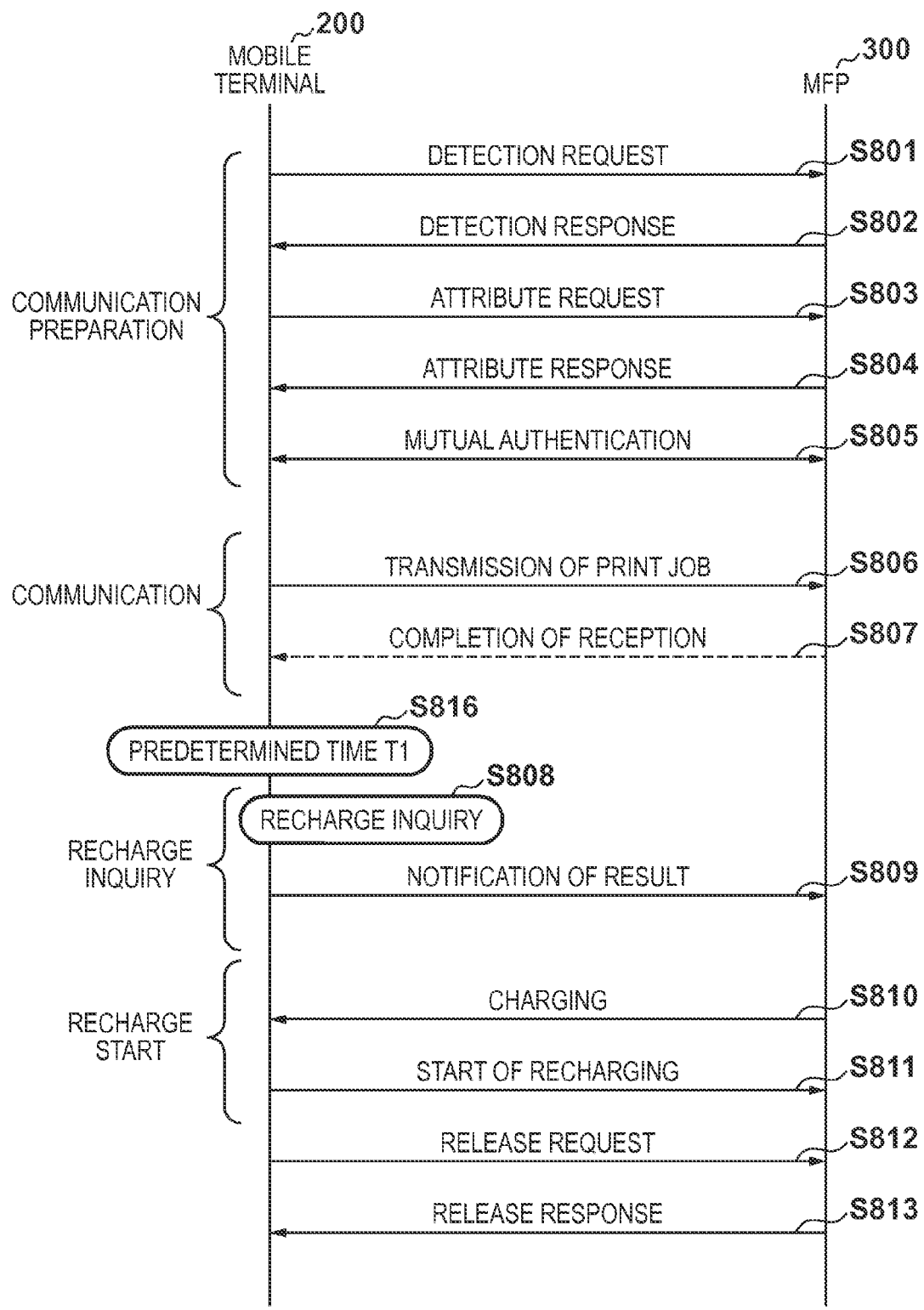
FIG. 8 is a sequence chart showing details of communication contents between the mobile terminal and the MFP.

FIG. 8 is a sequence chart showing details of communication contents between the mobile terminal 200 and the MFP 300.

Referring to FIG. 8, to establish NFC communication, the mobile terminal 200 serves as an initiator to issue a detection request (step S801), and detects the MFP 300 as a target. If the MFP 300 has been correctly detected, it transmits a detection response (step S802). Note that in the example shown in FIG. 8, the mobile terminal 200 serves as an initiator. In fact, however, the MFP 300 may serve as an initiator based on an input through the operation display unit 305 or the like.

If the detection response has been correctly received, the mobile terminal 200 transmits an attribute request for performing NFC communication (step S803). Upon receiving the attribute request, the MFP 300 returns an attribute response (step S804). At the time of transmitting the attribute request and the attribute response, NFC_ID of the initiator and that of the target are transmitted, thereby specifying communication partners based on these IDs. After that, mutual authentication is executed (step S805), and an encryption key or the like for data encryption can be transferred. Note that if it is not necessary to transfer an encryption key, mutual authentication need not be performed. The sequence of steps S801 to S805 corresponds to the communication preparation operation shown in FIG. 7.

A print job is transmitted (step S806). Note that a print job may be directly transmitted or transmitted after a handover. A case (direct transmission) in which the mobile terminal 200 directly transmits image data to the MFP 300 and a case (handover transmission) in which the MFP 300 acquires image data by performing a handover after reception of connection information, and making job settings in the mobile terminal 200 will be described.

Direct Transmission

In this case, both job data and image data are transmitted using NFC communication. The job data is, for example, data in which settings such as a print job are described. The image data is an entity of an image file to be actually printed by a print job.

Handover Transmission

In this case, job data and a job storage location are transmitted by NFC communication. With respect to an image file, after NFC is switched to WLAN whose speed is relatively higher than that of NFC, an image file having a large size is accessed. This makes it possible to reliably indicate a job execution destination using NFC, and save the communication time since image data is acquired by switching over the communication to WLAN which realizes high-speed communication.

In the case of direct transmission, therefore, the mobile terminal 200 is kept placed on the NFC unit 306 until the end of communication. To the contrary, in the case of handover transmission, NFC communication ends in a short time, and then the mobile terminal 200 may be removed from the NFC unit 306.

In either case, after transmission of a print job, the MFP 300 notifies that reception of the job is complete (step S807). The sequence of steps S806 and S807 corresponds to the communication operation shown in FIG. 7.

The timer of the mobile terminal 200 measures the predetermined time T1. When the time elapses (step S816), a recharge inquiry operation is performed (step S808). More specifically, a screen shown in FIG. 12A (to be described later) is displayed to inquire of the user whether or not to perform recharging. Note that in this embodiment, the mobile terminal 200 measures the time T1. However, the MFP 300 may measure the time, and notify the mobile terminal 200 of the result. After that, the mobile terminal 200 notifies the MFP 300 of the result of user selection (step S809). The sequence of steps S808 and S809 corresponds to the recharge inquiry operation shown in FIG. 7.

If, as a result of the recharge inquiry operation (step S808), the user selects to perform recharging, a fee is charged for recharging (step S810).

More specifically, a charge fee is decided based on a charging table held by the MFP 300, and the MFP 300 requests the fee of the mobile terminal 200 using NFC communication. The mobile terminal 200 pays the MFP 300 the predetermined fee by using electronic money. After confirmation of the payment, the MFP 300 causes a current to flow through a coil by the induced method to enable the wireless power supply unit 516. If the mobile terminal 200 is moved close to the wireless recharge stand 308 in this state, a current is induced in the coil of the wireless recharge unit 418, and thus the rechargeable battery 420 starts to be recharged (step S811). Step S810 corresponds to the charging operation in each of FIGS. 7A to 7D, and step S811 corresponds to the recharge start operation in each of FIGS. 7A to 7D.

After the start of recharging, the mobile terminal 200 transmits a release request (step S812). Upon receiving the release request, the MFP 300 transmits a release response (step S813), thereby terminating NFC communication.

Details of NFC communication processing associated with job transmission, recharge inquiry, and charging, which is executed by the mobile terminal 200 and MFP 300 will be described with reference to a flowchart.

Figure 9:
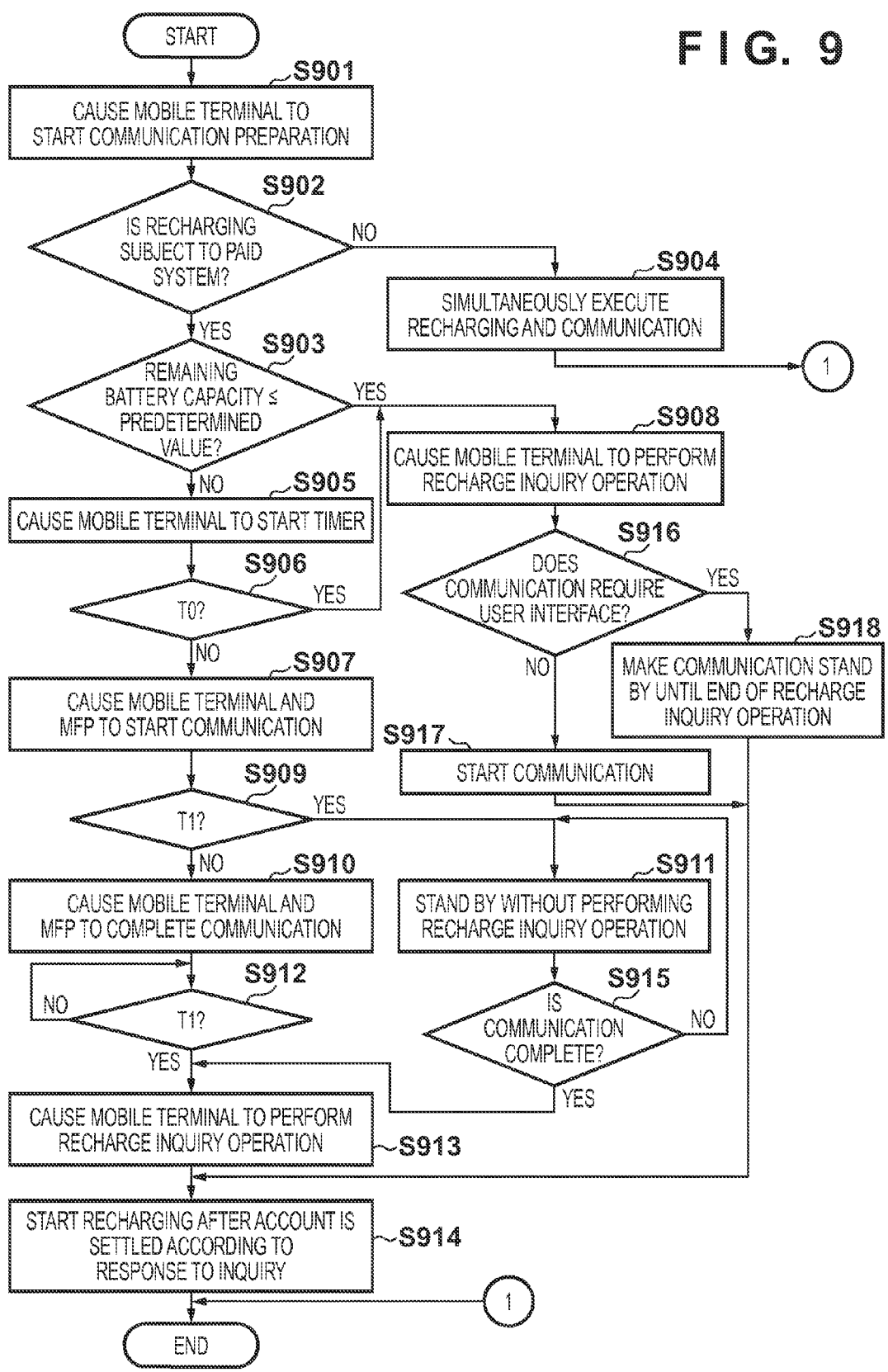
FIG. 9 is a flowchart illustrating details of NFC communication processing executed between the mobile terminal and the MFP.

FIG. 9 is a flowchart illustrating details of NFC communication processing executed between the mobile terminal 200 and the MFP 300. This processing assumes direct transmission by NFC communication. Note that programs corresponding to processes executed by the mobile terminal 200 and MFP 300 according to the sequence shown in FIG. 9 are stored in the ROM 403 of the mobile terminal 200 and the ROM 503 of the MFP 300, respectively. When the CPU 402 of the mobile terminal 200 and the CPU 502 of the MFP 300 respectively execute the programs on the RAMs 404 and 504, the processing shown in FIG. 9 is executed.

Note that in a case where the NFC unit of one of the mobile terminal 200 and MFP 300 performs communication as a target in the passive mode by NFC, even if no CPUs execute control, it is possible to transmit and receive data.

In step S901, the mobile terminal 200 starts communication preparation with the MFP 300. More specifically, the mobile terminal 200 prepares a desired job, and a user moves the NFC unit 201 of the mobile terminal 200 close to the NFC unit 306, and the wireless recharge unit 206 close to the wireless recharge stand 308. In step S902, the MFP 300 checks whether or not recharging is subject to a paid system. If the MFP 300 recognizes that recharging is free of charge, the process advances to step S904, and the MFP 300 starts recharging by enabling the wireless power supply unit 516 while the mobile terminal 200 starts transmission of the desired job by NFC communication.

To the contrary, if the MFP 300 recognizes that recharging is subject to a paid system, the process advances to step S903, and the mobile terminal 200 checks whether the remaining battery capacity of its own is equal to or smaller than a predetermined capacity. If the mobile terminal 200 determines that the remaining battery capacity is equal to or smaller than the predetermined capacity, the battery may become empty during subsequent communication, and thus the process advances to step S908 to recommend recharging before the start of communication. On the other hand, if the mobile terminal 200 determines that the remaining battery capacity is larger than the predetermined capacity, it is necessary to confirm with the user whether or not to perform recharging, and thus the process advances to step S905 and the mobile terminal 200 starts to measure the time by the timer.

In step S906, the mobile terminal 200 checks whether the predetermined time T0 has elapsed after the start of NFC communication. If the mobile terminal 200 determines that the predetermined time T0 has elapsed, the process advances to step S908. To the contrary, if transmission of the job by the NFC communication becomes possible before the predetermined time T0 elapses, the process advances to step S907 to start communication. Note that although not shown in FIG. 9, in step S907, communication may start in response to an instruction from the user of the communication terminal. In this case, it is determined in step S907 whether a user instruction has been issued. If a user instruction has been issued, NFC communication is started, and the process advances to step S909. If no user instruction can be confirmed, the process returns to step S906.

In step S909, measurement of the time by the timer and monitoring are continued, and it is checked whether or not the predetermined time T1 has elapsed during NFC communication between the mobile terminal 200 and the MFP 300. If the predetermined time T1 has elapsed, the process advances to step S911. In step S911, the mobile terminal 200 stands by until communication is completed without performing a recharge inquiry operation. In step S915, the mobile terminal 200 confirms completion of communication. When the mobile terminal 200 confirms completion of communication, the process advances to step S913, and the mobile terminal 200 performs a recharge inquiry operation. This corresponds to the case shown in FIG. 7B.

To the contrary, as shown in step S910, NFC communication between the mobile terminal 200 and the MFP 300 may end before the predetermined time T1 elapses. In this case, in step S912, the mobile terminal 200 stands by until the predetermined time T1 elapses. This corresponds to the case shown in FIG. 7A. When the predetermined time T1 elapses, the process advances to step S913, and the mobile terminal 200 performs a recharge inquiry operation. Upon completion of the inquiry operation, the process advances to step S914, and an account is settled according to user selection, thereby starting recharging.

A case in which the process advances to step S908 will be described. This corresponds to the case shown in FIG. 7C. In step S908, the mobile terminal 200 inquires of the user whether or not to perform recharging. This is done by displaying a message on the display unit of the mobile terminal 200.

Figure 12A:
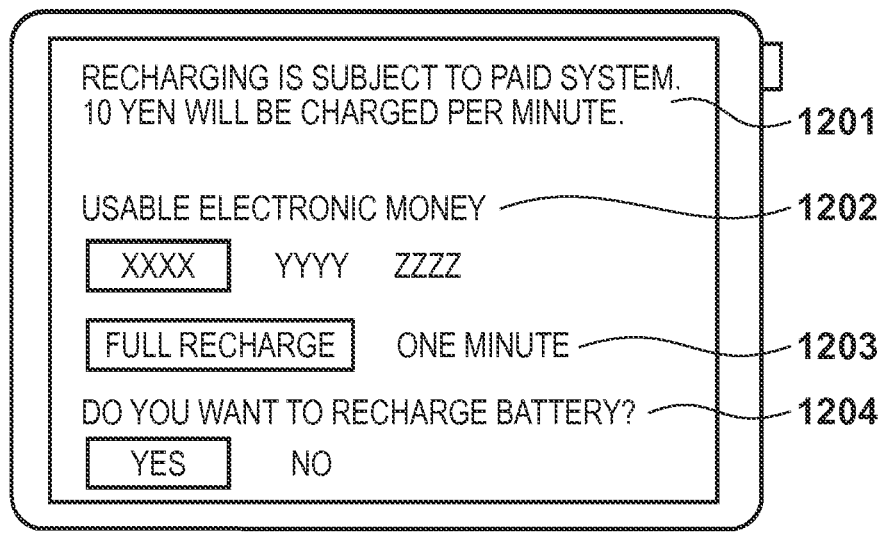
FIGS. 12A and 12B are views showing display examples of an inquiry message using the display screens of the mobile terminal and MFP.
Figure 12B:
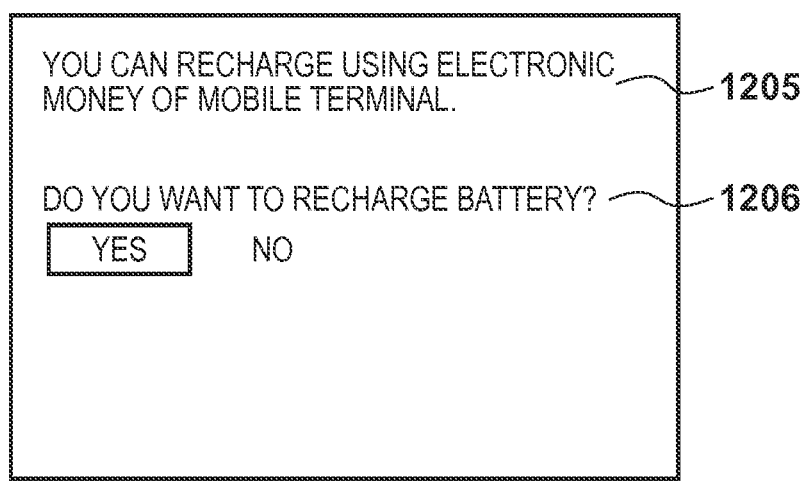

FIGS. 12A and 12B are views showing display examples of an inquiry about charging.

FIG. 12A shows a display example on the display unit 203 of the mobile terminal 200, and FIG. 12B shows a display example on the operation display unit 305 of the MFP 300.

For example, as shown in FIG. 12A, a message 1201 indicating that a fee is charged for recharging is displayed to notify the user of it, thereby explaining the tariff of charging. In this example, 10 yen is charged per minute. However, a tariff can be freely set. For example, a fee to be charged to fully recharge the battery may be set. In addition to the message 1201, a usable electronic money list 1202 is displayed. With respect to displayed electronic money, a list of types of electronic money which can be handled by the MFP 300 may be displayed, or electronic money held by the mobile terminal 200 may be displayed by negotiating with the mobile terminal 200 in advance. Alternatively, instead of causing the user to make a selection, electronic money may be automatically selected by NFC communication with the mobile terminal 200. Note that an option 1203 of selecting either fully recharging the battery or charging a fee per unit time are displayed as one of options presented to the user. If the user selects to fully recharge the battery, the rechargeable battery 420 is continuously recharged and a fee is automatically, continuously charged until the rechargeable battery 420 is fully recharged. On the other hand, if the user selects charging per unit time, an inquiry about whether or not to continue recharging is issued to the user per unit time. A message 1204 is a message to ask whether or not to start recharging. If "YES" is selected, recharging starts.

Referring back to FIG. 9, after step S908, the process determines in step S916 whether or not a user interface is necessary for job transmission by NFC communication. This is because it is determined whether or not it is possible to start communication while displaying the message shown in FIG. 12A. If no user interface is necessary for communication, the process advances to step S917 to start communication; otherwise, the process advances to step S918 to control to make the start of communication stand by until the end of a recharge inquiry operation. Upon completion of the recharge inquiry operation, the process advances to step S914 to settle an account according to user selection, thereby starting recharging.

By executing the above-described processing, it is possible to inquire of the user whether or not to perform recharging when a predetermined time elapses after the mobile terminal 200 starts communication with the MFP 300. This can reduce the inconvenience of user responses by preventing an inquiry about charging from often being issued while preventing a situation in which recharging is executed against the user's intention and the user is unexpectedly charged. Furthermore, even if a communication timing coincides with a timing of issuing an inquiry about recharging, it is possible to suppress a decrease in user convenience by standing by until the inquiry operation ends.

Note that in the determination processing in step S912, it may be determined whether or not the time after completion of communication, which has been measured in step S910, is longer than the predetermined time T2. If the time is longer than the predetermined time T2, an inquiry operation is performed in step S913. This corresponds to the case shown in FIG. 7D.

Before displaying the inquiry screen in step S913, confirmation of the remaining battery capacity in step S903 may be re-executed. If the remaining battery capacity is equal to or smaller than the predetermined capacity, the screen may be displayed in step S913.

Furthermore, after determining in step S906 that the time T0 has elapsed, it may be determined whether or not the communication preparation operation started in step S901 is complete. If the communication preparation operation is complete, the processes in step S907 and subsequent steps may be executed, instead of executing the processes in step S908 and subsequent steps. On the other hand, if the communication preparation operation is not complete when the time T0 elapses, no communication is performed yet and thus an inquiry operation may be performed. If the MFP 300 performs an inquiry operation, it performs an inquiry operation after it gets ready to communicate.

Upon start or completion of NFC communication preparation, the above-described recharge inquiry operation may be performed first, irrespective of whether or not NFC communication has started.

As described above, either the mobile terminal 200 or the MFP 300 may perform measurement of the time by the timer and inquiry display control in FIG. 9. If the MFP 300 performs the above processing, the MFP 300 may transmit the image of the inquiry screen to the mobile terminal and the mobile terminal may display the received image, or the image may be stored in the mobile terminal in advance and the MFP 300 may transmit, to the mobile terminal, an instruction to display the image.

In the example of FIG. 9, for example, in order for the mobile terminal 200 to serve as a trigger to perform NFC communication, the mobile terminal 200 may operate as an initiator and the MFP 300 may operate as a target. In this case, in order for the MFP 300 to notify the mobile terminal 200 of an inquiry as a result of measurement of the time by the MFP 300, the image of the inquiry or an instruction to display the image of the inquiry is stored in the memory of the NFC unit 515. When the mobile terminal 200 serving as an initiator reads out the information, the aforementioned notification processing can be performed. In addition, if the MFP 300 notifies the mobile terminal 200 of an inquiry as a result of measurement of the time by the MFP 300, a request to exchange the initiator and target may be stored in the memory of the NFC unit 515. When the mobile terminal 200 reads out the request, and exchanges the initiator and target, the MFP 300 serving as an initiator can instruct the mobile terminal 200 to inquire of the user recharging.

If the mobile terminal 200 serves as an initiator to start NFC communication, it can start NFC communication when, for example, the user of the mobile terminal 200 issues an instruction to the mobile terminal 200 upon completion of NFC communication preparation. Therefore, if there is no instruction from the user of the mobile terminal 200 to start NFC communication during NFC communication preparation or after completion of communication preparation, the above-described inquiry operation may be performed. In this case, if the instruction is input before the inquiry operation is performed during NFC communication preparation or after completion of communication preparation, the inquiry operation is performed after NFC communication is performed.

Communication processing executed between the mobile terminal 200 and the MFP 300 in the case of handover transmission will be described next.

As described above, in the case of direct transmission, the mobile terminal 200 is kept placed on the NFC unit 306 until the end of NFC communication. In the case of handover transmission, however, upon completion of communication for a short time by NFC communication, the mobile terminal 200 may be removed from the NFC unit 306. In the case of handover transmission, therefore, the probability of recharging is low.

In consideration of the above points, the communication processing executed between the mobile terminal 200 and the MFP 300 in the case of handover transmission will be explained.

Figure 10:
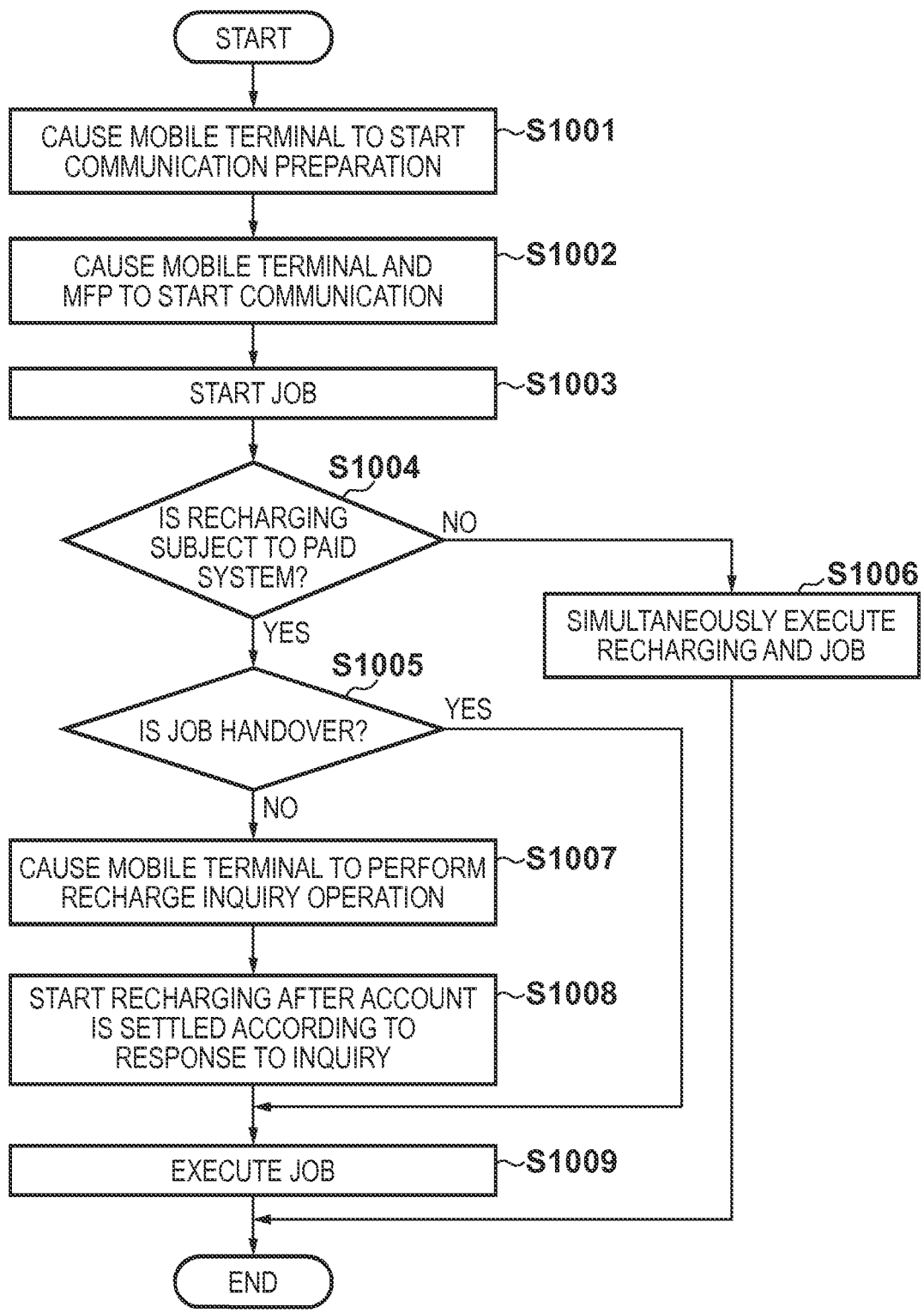
FIG. 10 is a flowchart illustrating communication processing in a case where job communication between the mobile terminal and the MFP is a handover.

FIG. 10 is a flowchart illustrating details of the communication processing executed between the mobile terminal 200 and the MFP 300.

Similarly to step S901, in step S1001, the mobile terminal 200 starts communication preparation. Similarly to step S906, in step S1002, the mobile terminal 200 starts NFC communication with the MFP 300. In step S1003, the MFP 300 analyzes a job received in the processing in step S1002, and starts execution of the job. In step S1004, simultaneously with execution of the job, it is checked whether or not recharging is subject to a paid system. If it is recognized that recharging is not subject to a paid system, the process advances to step S1006, and recharging and the job are simultaneously executed.

To the contrary, if it is recognized that recharging is subject to a paid system, the process advances to step S1005, and it is checked whether or not the job is handover transmission in order to confirm with the user whether or not to perform recharging. If it is determined that the job received by the MFP 300 is handover transmission, the probability of recharging is low and thus the process advances to step S1009 in which a recharge inquiry operation is suppressed, and only the job is executed without executing recharging.

On the other hand, if it is determined that the job is not handover transmission, it is considered that the user might keep placing the mobile terminal 200 on the NFC unit 306, that is, the wireless recharge stand 308 for a given time at high probability, and thus the process advances to step S1007 to perform a recharge inquiry operation. Processes in steps S1007 and S1008 are the same as those in steps S913 and S914 and a description thereof will be omitted.

As described above, by executing the communication processing shown in FIG. 10, it is possible to inquire of the user whether or not to perform recharging for only a job for which the probability of recharging is relatively high. This contributes to decreasing the number of opportunities that the user responds to the inquiry, thereby improving the user operability as compared with a case in which an inquiry operation is often performed.

Corresponding processing in a case where it is impossible to inquire about recharging using the display unit 203 and operation unit 204 of the mobile terminal 200 since the remaining capacity of the rechargeable battery of the mobile terminal 200 is equal to or smaller than the predetermined capacity will be described.

Since the mobile terminal 200 includes a unit of making payment by electronic money using NFC communication which requires no power, it can perform paid recharging even if the power is OFF. Even if, however, the mobile terminal 200 whose power is OFF is moved close to the wireless recharge stand 308, it is unknown yet whether or not the user wants to recharge the battery even though a fee is charged for recharging. A case in which the display unit 511 and operation unit 509 of the MFP 300 are used to inquire of the user whether or not recharging is desired will be explained.

Figure 11:
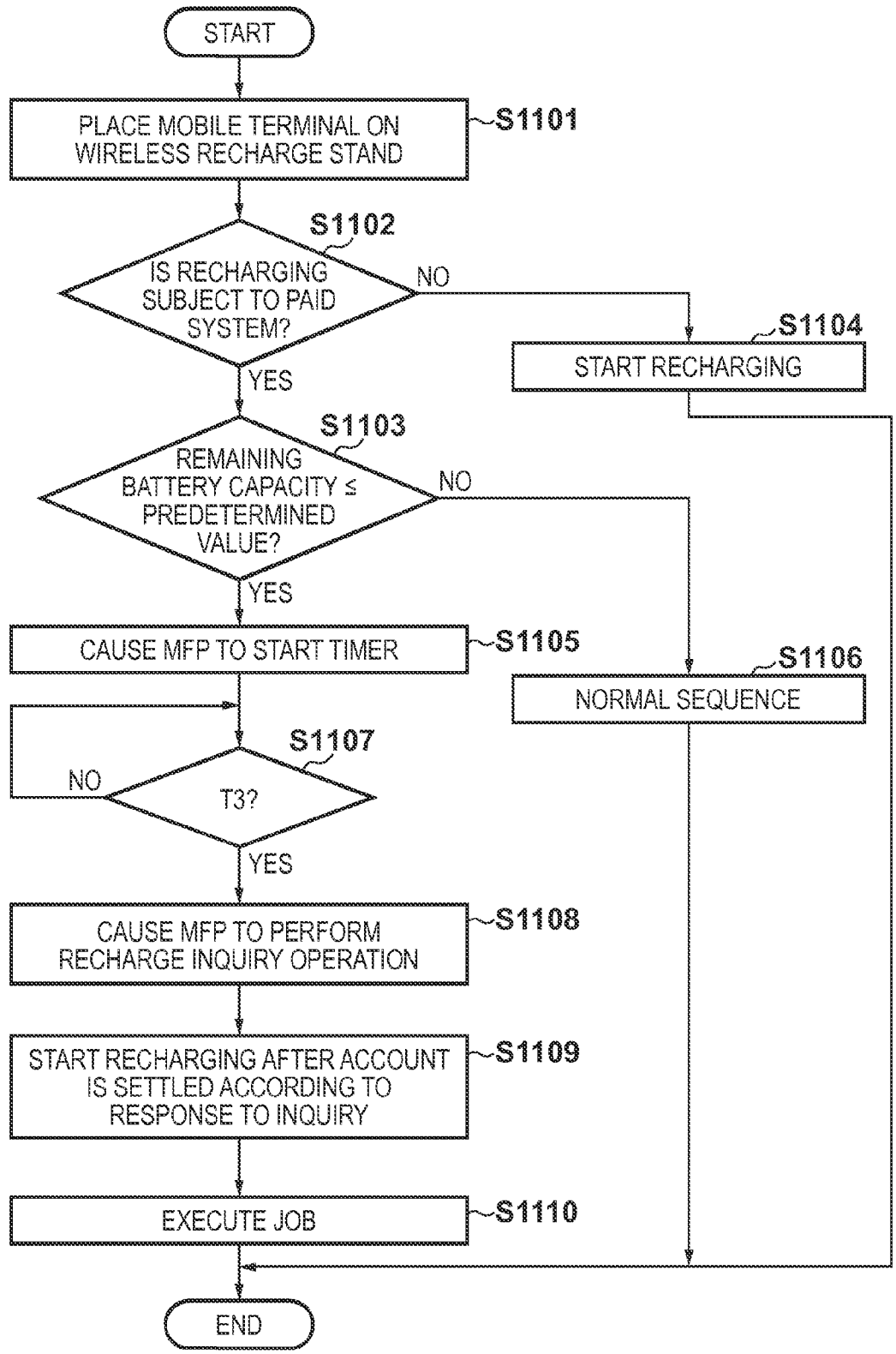
FIG. 11 is a flowchart illustrating processing of inquiring about recharging in a case where the remaining capacity of the rechargeable battery of the mobile terminal is equal to or smaller than a predetermined value.

FIG. 11 is a flowchart illustrating processing in which the MFP is used to inquire about recharging.

In step S1101, the mobile terminal 200 in a power-off state is moved close to the wireless recharge stand 308. In step S1102, the MFP 300 checks whether or not recharging is subject to a paid system. If the MFP 300 recognizes that recharging is not subject to a paid system, the process advances to step S1104 to start recharging.

On the other hand, if the MFP 300 recognizes that recharging is subject to a paid system, the process advances to step S1103, and the MFP 300 checks the remaining capacity of the rechargeable battery of the mobile terminal 200 using a wireless power supply protocol, and determines whether or not the remaining capacity is equal to or smaller than a predetermined value. If the MFP 300 determines that the remaining capacity is larger than the predetermined value, the process advances to step S1106 to switch over the process to the communication processing shown in FIG. 9, thereby executing it.

Note that the determination processing in step S1103 need not be executed. In this case, instead of checking the remaining capacity of the rechargeable battery, it is only necessary to determine whether or not the power of the mobile terminal 200 is OFF.

If the MFP 300 determines that the remaining capacity of the rechargeable battery is equal to or smaller than the predetermined value, the process advances to step S1105 and the MFP 300 starts to measure the time by the timer. Furthermore, in step S1107, the MFP 300 checks whether the elapsed time after the start of measurement of the time reaches a predetermined time T3. After the predetermined time T3 elapses, the process advances to step S1108 and the MFP 300 inquires of the user recharging using the display unit 511. The display contents are as shown in FIG. 12B.

That is, a message 1205 is used to cause the user to recognize that electronic money of the mobile terminal 200 is to be used, and a message 1206 is used to prompt the user to determine whether or not to perform recharging. Processes in steps S1109 and S1110 are the same as those in steps S1008 and S1009 and a description thereof will be omitted.

As described above, by executing the communication processing shown in FIG. 11, the user of the mobile terminal 200 can perform recharging using electronic money of the mobile terminal 200, if desired, even if the mobile terminal 200 is powered off since the rechargeable battery becomes empty.

According to the above-described embodiment, when recharging the mobile terminal by wireless power supply, it is possible to improve the user convenience by reducing the number of times of a recharge inquiry operation while preventing recharging and charging against the user's intention.

Note that whether the MFP 300 performs communication as a target or initiator may be used as a condition under which it is determined whether the power of the mobile terminal 200 is OFF. If, for example, the MFP 300 operates as a target by an RF field from the mobile terminal 200, the power of the mobile terminal 200 is ON, and thus the processing shown in FIG. 9 is executed. On the other hand, if the MFP 300 recognizes the mobile terminal 200 as a target while MFP 300 is serving as an initiator, the power of the mobile terminal 200 may be OFF, and thus the processing shown in FIG. 11 is performed.

Note that in the aforementioned embodiment, as a method of inquiring whether to execute recharging, a message is displayed on the inquiry screen. The present invention, however, is not limited to this. For example, an inquiry operation may be performed using voice, and the user may perform a predetermined operation in response to the voice, thereby starting recharging.

Although printing by the MFP 300 has been exemplified as an example of a "job" in the aforementioned embodiment, processing corresponding to a "job" is not limited to this. For example, processing of transmitting data (for example, a read image obtained by reading a document using the MFP 300, or a document or image stored in the memory of the MFP 300) from the MFP 300 to the mobile terminal 200 may be adopted. More specifically, when the mobile terminal 200 requests the MFP 300 to transmit the data as a "job", the MFP 300 transmits various data to the mobile terminal 200 in response to the request. As processing corresponding to a "job", processing in which the MFP 300 stores data transmitted from the mobile terminal 200 to the MFP 300 in an internal or external memory may be performed. Alternatively, processing in which the MFP 300 transmits the data to an external apparatus (for example, a server on the network) may be used.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

Note that the functions of the embodiment can also be implemented by the following arrangement. That is, the functions of the embodiment are also implemented when program codes for performing the processes of the embodiment are supplied to a system or apparatus, and the computer (or the CPU or MPU) of the system or apparatus executes the program codes. In this case, the program codes read out from a storage medium implement the functions of the above-described embodiment, and the storage medium storing the program codes also implement the functions of the embodiment.

Furthermore, the program codes for implementing the functions of the embodiment may be executed by a single computer (CPU or MPU) or a plurality of computers in cooperation. Also, a computer may execute the program codes or hardware such as a circuit for implementing the functions of the program codes may be provided. Alternatively, some of the program codes may be implemented by hardware and the remaining program codes may be executed by the computer.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-159718, filed Jul. 31, 2013, which is hereby incorporated by reference herein in its entirety.

What is claimed is:

1. A network system comprising a mobile terminal which is capable of operating by a rechargeable battery and transmits a job by short distance wireless communication, and an information processing apparatus which receives the job by short distance wireless communication, and executes the job, wherein the information processing apparatus comprises:
a first communication unit configured to perform short distance wireless communication;
a power supply unit configured to supply power by wireless power supply; and
a processing unit configured to execute processing of the job received from the mobile terminal by the first communication unit, and the mobile terminal comprises:
a second communication unit configured to perform short distance wireless communication with the first communication unit of the information processing apparatus; and
a recharge unit configured to recharge the rechargeable battery by wireless power supply by the power supply unit, wherein it is controlled to perform an inquiry operation of inquiring of a user whether to recharge the rechargeable battery by wireless power supply at a timing different from a timing of transmission of the job, based on start or completion of the transmission by the first communication unit.

2. The network system according to claim 1, wherein the inquiry operation is controlled and performed at a timing based on the start or completion of the transmission and an elapsed time after start of communication between the mobile terminal and the information processing apparatus.

3. The network system according to claim 1, wherein the first communication unit and the second communication unit operate according to NFC communication protocols, respectively.

4. The network system according to claim 1, wherein
the job is a print job, and
the information processing apparatus further comprises a printing unit configured to execute printing by receiving the job by the first communication unit.

5. The network system according to claim 1, wherein it is controlled to perform payment operation of a fee for the recharging by the recharge unit, in accordance with a response by the user to the inquiry operation.

6. The network system according to claim 5, wherein the recharging by the recharge unit is performed after the payment operation is completed.

7. A mobile terminal which is capable of operating by a rechargeable battery, and transmits a job to an information processing apparatus by short distance wireless communication, comprising:
a first communication unit configured to perform short distance wireless communication;
a recharge unit configured to recharge the rechargeable battery by wireless power supply;
a query unit configured to inquire of a user whether to recharge the rechargeable battery by wireless power supply; and
a control unit configured to control to perform the inquiry operation by the query unit at a timing different from a timing of the communication, based on start or completion of transmission of the job by the communication unit.

8. The mobile terminal according to claim 7, wherein the control unit is further configured to control to perform the inquiry operation at a timing based on the completion of the transmission of the job.

9. The mobile terminal according to claim 7,
wherein the job is a print job, and
further comprising:
a timer unit configured to start measurement of a time after start of communication with the information processing apparatus, and measure an elapsed time after the start; and
a monitoring unit configured to monitor whether the elapsed time measured by the timer unit has reached a predetermined time, and whether transmission of the print job is complete.

10. The mobile terminal according to claim 9, wherein in a case where it is determined, based on time measurement by the timer unit and monitoring by the monitoring unit that the transmission of the print job has been completed before the predetermined time elapses, the control unit is further configured to control the query unit to perform the inquiry operation.

11. The mobile terminal according to claim 9, wherein in a case where it is determined, based on time measurement by the timer unit and monitoring by the monitoring unit that the predetermined time has elapsed before completion of the transmission of the print job, the control unit is configured to control to make the inquiry operation by the query unit stand by until end of the transmission of the print job.

12. The mobile terminal according to claim 9, wherein
the timer unit is further configured to measure an elapsed time after the start of the communication with the information processing apparatus,
the monitoring unit is further configured to monitor whether the measured elapsed time reaches another predetermined time shorter than the predetermined time, and
in a case where it is determined, based on time measurement by the timer unit and monitoring by the monitoring unit that the other shorter predetermined time has elapsed before the start of the transmission of the print job, the control unit is further configured to control the query unit to perform the inquiry operation.

13. The mobile terminal according to claim 7, further comprising
a detection unit configured to detect a remaining capacity of the rechargeable battery,
wherein in a case where the detection unit detects that the remaining capacity is not larger than a predetermined value, the control unit is further configured to control the query unit to perform the inquiry operation.

14. The mobile terminal according to claim 7, further comprising:
a second communication unit configured to perform wireless communication with a communicable range wider than that of the first communication unit; and
a determination unit configured to determine whether the print job is transmitted by handover using the first communication unit and the second communication unit,
wherein in a case where the determination unit determines that the print job is transmitted by handover, the control unit is further configured to control to suppress the inquiry operation by the query unit.

15. The mobile terminal according to claim 7, wherein it is controlled to perform payment operation of a fee for the recharging by the recharge unit, in accordance with a response by the user to the inquiry operation.

16. The mobile terminal according to claim 15, wherein the recharging by the recharge unit is performed after the payment operation is completed.

17. A control method for a mobile terminal which operates by a rechargeable battery and includes a recharge unit configured to recharge the rechargeable battery by wireless power supply, comprising:
transmitting a job to an information processing apparatus by short distance wireless communication; and
controlling to inquire of a user whether to recharge the rechargeable battery by wireless power supply at a timing different from a timing of transmission of the job, based on start or completion of the transmission.

18. A non-transitory computer readable storage which stores a computer program to be executed in a mobile terminal which is capable of operating by a rechargeable battery and transmits a job to an information processing apparatus by short distance wireless communication, the program comprising:
performing short distance wireless communication;
inquiring of a user whether to recharge the rechargeable battery by wireless power supply;
controlling to perform the inquiry operation at a timing different from a timing of the communication, based on start or completion of transmission of the job by the short distance wireless communication; and recharging the rechargeable battery by wireless power supply.

19. A control method for a mobile terminal which operates by a rechargeable battery and includes a recharge unit configured to recharge the rechargeable battery by wireless power supply, comprising:
transmitting a print job to an information processing apparatus, by predetermined wireless communication based on short distance wireless communication with the information processing apparatus; and
controlling to inquire of a user whether to recharge the rechargeable battery by wireless power supply at a timing different from a timing of transmission of the print job, based on start or completion of the transmission.

20. The control method according to claim 19, wherein the inquiry is performed at a timing based on completion of the transmission of the print job.

21. The control method according to claim 19, further comprising:
measuring an elapsed time after start of communication with the information processing apparatus; and
monitoring whether the elapsed time has reached a predetermined time, and whether the transmission of the print job is complete.

22. The control method according to claim 21, wherein in a case where it is determined, based on the measuring and the monitoring that the transmission of the print job has been completed before the predetermined time elapses, the inquiry is performed.

23. The control method according to claim 21, wherein in a case where it is determined, based on the measuring and the monitoring that the predetermined time has elapsed before completion of the transmission of the print job, the inquiry stands by until end of the transmission of the print job.

24. The control method according to claim 21, wherein it is further monitored whether the measured elapsed time reaches another predetermined time shorter than the predetermined time, and
in a case where it is determined, based on the measuring and the monitoring that the other shorter predetermined time has elapsed before the start of the transmission of the print job, the inquiry is performed.

25. The control method according to claim 19, further comprising detecting a remaining capacity of the rechargeable battery,
wherein in a case where it is detected that the remaining capacity is not larger than a predetermined value, the inquiry is performed.

26. The control method according to claim 19, wherein payment operation of a fee for the recharging by the recharge unit is performed, in accordance with a response by the user to the inquiry.

27. The control method according to claim 26, wherein the recharging by the recharge unit is performed after the payment operation is completed.

28. The control method according to claim 19, wherein the short distance wireless communication is NFC.

29. The control method according to claim 28, wherein the predetermined wireless communication is WLAN.

* * * * *